(12) United States Patent
Post

(10) Patent No.: US 7,882,499 B2
(45) Date of Patent: Feb. 1, 2011

(54) CACHING DYNAMICALLY COMPILED CODE TO STORAGE

(75) Inventor: Bradley S. Post, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 1218 days.

(21) Appl. No.: 11/256,763

(22) Filed: Oct. 24, 2005

(65) Prior Publication Data

US 2007/0094648 A1    Apr. 26, 2007

(51) Int. Cl.
G06F 9/45 (2006.01)
G06F 15/177 (2006.01)
G06F 12/00 (2006.01)

(52) U.S. Cl. ............ 717/153; 717/138; 717/140; 709/220; 711/118

(58) Field of Classification Search .......... None
See application file for complete search history.

(56) References Cited

U.S. PATENT DOCUMENTS

| | | | | |
|---|---|---|---|---|
| 5,212,794 A * | 5/1993 | Pettis et al. | ............... | 717/153 |
| 6,078,744 A * | 6/2000 | Wolczko et al. | ............ | 717/153 |
| 6,370,687 B1 * | 4/2002 | Shimura | ............... | 717/146 |
| 6,978,462 B1 * | 12/2005 | Adler et al. | ............... | 719/318 |
| 6,983,315 B1 * | 1/2006 | Crutcher | ............... | 709/220 |
| 2004/0123278 A1 * | 6/2004 | Nanja et al. | ............... | 717/153 |
| 2005/0015758 A1 * | 1/2005 | North | ............... | 717/138 |
| 2005/0183077 A1 * | 8/2005 | Langdale et al. | ............ | 717/148 |
| 2006/0090157 A1 * | 4/2006 | Park et al. | ............... | 717/140 |
| 2006/0248265 A1 * | 11/2006 | Schultz et al. | ............... | 711/6 |

OTHER PUBLICATIONS

"Locality analysis to control dynamically way-adaptable caches", Kobayashi et al., Jun. 2005, pp. 25-32, <http://delivery.acm.org/10.1145/1110000/1101874/p25-kobayashi.pdf>.*

"Compilation techniques for energy reduction in horizontally partitioned cache architectures", Shrivastava et al., Sep. 2005, pp. 90-96, <http://delivery.acm.org/10.1145/1090000/1086310/p90-shrivastava.pdf>.*

* cited by examiner

*Primary Examiner*—Thuy Dao
(74) *Attorney, Agent, or Firm*—Vierra Magen Marcus & DeNiro LLP

(57) ABSTRACT

Dynamically compiled code is stored for future use by an emulator application. The emulator application may recall the previously compiled code rather than recompile the same code again. Recycling previously compiled code prevents unneeded code compilation, and saves valuable processing time and resources. Previously compiled code can be associated with code identification information. When compiled code is needed, one or more indexes of compiled code identification information is searched. If the appropriate identification information is found, the corresponding code is loaded and executed.

20 Claims, 7 Drawing Sheets

US 7,882,499 B2

CACHING DYNAMICALLY COMPILED CODE TO STORAGE

BACKGROUND

Emulator software programs allow an application for use in one platform to be used on a machine running another platform. This allows computing systems (a host machine) to run applications for more than one platform. A host machine implements a host environment (or host platform). The host environment is associated with the operating system of a computing system. An emulator application running in the host environment emulates a guest platform. Usually, processing is performed in one platform at a time. For example, applications may be run in either a host or guest environment, but not both environments at the same time.

Emulators sometimes require a switch to be made between environments. For example, when code compatible with a guest environment is to be compiled into host compatible code, the host environment compiles the code. To compile code for a guest environment compatible application, the guest application code is read. Next, the guest environment is paused or otherwise deactivated, and the host environment is then activated. Code for execution in the host environment is then compiled from the guest application code by the host machine. The host environment is then deactivated, the guest environment is reactivated and the compiled instructions are eventually executed. After execution, the compiled code is eventually overwritten.

Switching between a host environment and guest environment consumes time and processing resources. Typically, switches between environments are required for code compiling because the compiling must be performed by the host machine. This results in slower performance of emulator software programs running an application configured for a guest environment.

SUMMARY

The technology herein, roughly described, pertains to saving dynamically compiled code to storage media for future use by an emulator application. When previously compiled code can be reused, the emulator application may recall the stored compiled code rather than recompile the same code. Thus, instead of re-compiling the same guest platform compatible code more than once, the resulting host compatible compiled code can be recycled. This reuse of previously compiled code prevents repetitious code compilation, thereby conserving valuable processing time in switching between a guest and host environment in order to compile code.

In one embodiment, compiled code is executed from a code cache associated with the emulator application. The code cache is a portion of memory allocated for use by the emulator. Previously compiled code may be stored in the code cache, or moved into the code cache from a secondary memory (e.g., storage media). In any case, blocks of previously compiled code are associated with code identification information. A hash table or other indexing mechanism may contain the identification information associated with previously compiled code. When compiled code is needed, the identification information for the code required is compared against the identification information for the compiled code available. If a match is found, the compiled code associated with the matching identification information is loaded into the cache code (if it is not already present) and executed.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

DETAILED DESCRIPTION

Figure 1A:
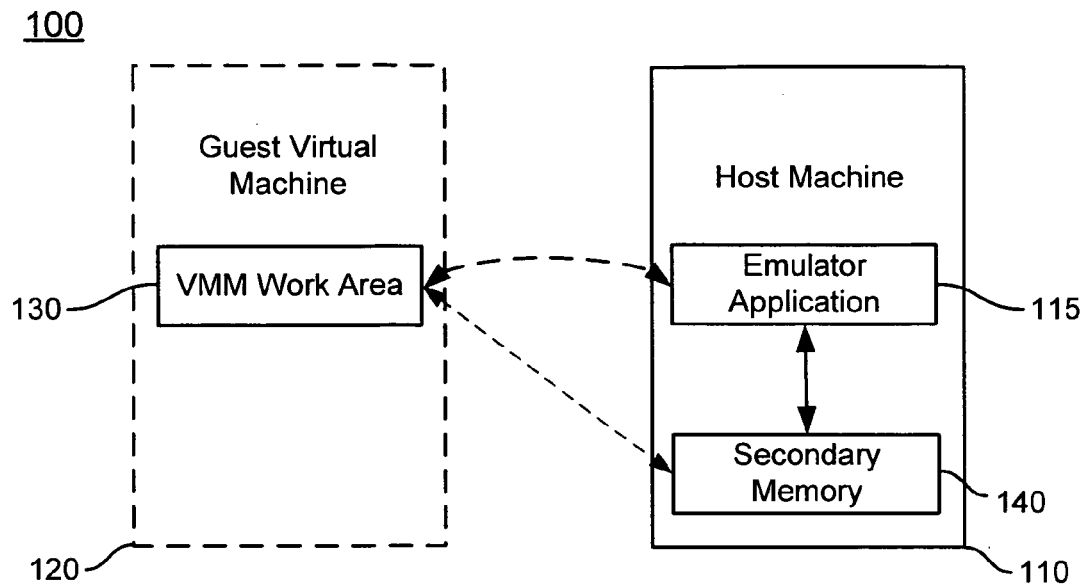
FIG. 1A illustrates a block diagram of an embodiment of an emulated environment.

Dynamically compiled code is saved to storage media for future use by an emulator application. The emulator application may recall the stored compiled code in the future rather than recompile the same code. Recalling previously compiled code prevents repetitious code compilation. By avoiding the repetitive code compiling, valuable processing time and resources are preserved.

In one embodiment, compiled code is executed from a code cache associated with the emulator application. The code cache is a portion of memory allocated for use by the emulator. Previously compiled code may be stored in the code cache or a secondary memory (e.g., storage media). When previously compiled code located in a secondary memory is to be reused, the compiled code is loaded from the memory location into the code cache.

Blocks of previously compiled code can be managed and retrieved in several ways. In one embodiment, blocks of previously compiled code are associated with code identification information. A hash table or other indexing mechanism may contain the identification information associated with previously compiled code. In one embodiment, a separate hash table of code block identification information may be used for a code cache and a secondary memory. When compiled code is required, the identification information for the required code is compared against the identification information for the available compiled code. If a match is found, the available compiled code associated with the matching identification information is loaded into the cache code and executed. This is discussed in more detail below.

In one embodiment, when compiled code is loaded into a secondary memory or code cache, a hash table associated with the particular memory is modified to indicate the addition of the code. In particular, the identification information and an associated memory location for the compiled code is added to the hash table. If the hash table is later queried for the identification information, it may return the memory location for the compiled code associated with the matching identification information. When compiled code is removed from a code cache or secondary memory, the corresponding entry is removed from the hash table associated with the code cache or secondary memory.

In some embodiments, a hash table used herein may use a data structure to track compiled code. An example of such a data structure for use with a code cache hash table is below:

```
struct CodeCacheHashTableEntry
{
    unsigned long    fVMMWorkAreaCodeCacheAddr;
    unsigned long    fGuestEntryPC;
};
```

In the data structure above, the memory address of the code being tracked by the code cache hash table is associated with fVMMWorkAreaCodeCacheAddr. The data structure listed above is intended to be an example, and other data structures may be used to track code in a code cache or secondary memory.

In one embodiment, the code block identification information may include just-in-time (JIT) data. JIT data may include virtual bus page data, virtual page data, instruction pointer data, check sum data, time stamp data and other data. Virtual bus page data may include a virtualized physical RAM memory address at which the virtual bus page is stored. The check sum data is a summation of the value of the bits comprising the native guest environment instructions that were dynamically recompiled. JIT data may include an expected physical memory address location for the compiled code, error identification information, and other information. JIT data can be generated by the emulator and can be derived from the guest virtual environment.

In some embodiments, block identification information may be configured as a data structure to track compiled code. An example of such a data structure for use code blocks is below:

```
struct CodeBlockInfo
{
    unsigned long fGuestEntryPC;
    unsigned long fGuestPageLogicalAddr;
    unsigned long fGuestBusPage;
    unsigned long fBlockTimeStamp;
    unsigned long fBlockSavedToSecondaryMemory;
    unsigned long fCodeBlockChecksum;
    // Host specific code follows
    unsigned long fGuestDynamicCode;
};
```

The data structure above allows information to be stored for a code block of data that may be stored in code cache as well as secondary memory. In particular, fGuestPageLogicalAddr provides information regarding the virtual page for the code, fGuestBusPage provides information regarding the virtual page address associated with the bus page, fBlockTimeStamp provides a time stamp associated with when the code block was written to the code cache or when the code was last accessed, fBlockSavedToSecondaryMemory indicates whether the block has been stored to secondary memory and fCodeBlockChecksum includes checksum information for the code block information. The data structure listed above is intended to be an example, and other data structures may be used to track code in a code cache or secondary memory.

FIG. 1A is a block diagram of an embodiment of an emulated environment. The block diagram of FIG. 1A includes host machine 110. Host machine 110 includes emulator application 115 and secondary memory 140, and implements a host environment. Emulator application 115 implements guest virtual machine 120. Guest virtual machine 120 includes Virtual Machine Monitor (VMM) work area 130 and implements a guest environment. In one embodiment, guest virtual machine 120 and host machine 110 both have access to VMM work area 130. Additionally, both emulator application 115 and VMM work area 130 may store and retrieve data from secondary memory 140.

Emulator application 115 is a software emulator configured to run on host machine 110. Emulator 115 emulates a guest platform other than that associated with the host machine. The guest environment may run applications compatible with a guest application. In one embodiment, emulator application may emulate a PC based operating system utilizing an Intel x86 motherboard and chip set or equivalent chip set. In some embodiments, emulator application 115 may be implemented by the software "Virtual PC for Mac," by Microsoft Corporation, of Redmond, Wash. In this embodiment, the host environment can be implemented as a Macintosh operating system, by Apple Computer, of Cupertino, Calif. Host machine 110 is described in more detail with respect to system 200 of FIG. 2 below.

Guest virtual machine 120 is a logical machine configured by and in communication with emulator application 115. In one embodiment, guest virtual machine 120 is implemented entirely by computer code. Guest virtual machine 120 includes VMM work area 130. VMM work area 130 includes emulator code and a cache for storing host compatible code. In some embodiments, VMM work area 130 may communicate with secondary memory 140 and emulator application 115. VMM work area 130 is discussed in more detail below with respect to FIG. 1B.

Secondary memory 140 may be any memory mechanism accessible by VMM work area 130 of guest virtual machine 120 and emulator application 115. Examples of secondary memory 140 include RAM, flash memory, a hard disk, a secondary cache or other local memory within the computing system on which guest virtual machine 120 is running. Secondary memory 140 may also be a remote memory source, such as a remote hard drive or database in communication with the computing system on which guest virtual machine 120 runs. Secondary memory 140 may store compiled code loaded from a code cache (such as code cache 134 of FIG. 1B, discussed below). The compiled code stored in secondary memory 140 may then be accessed or retrieved for execution of the code or other processing. This is discussed in more detail below.

Figure 1B:
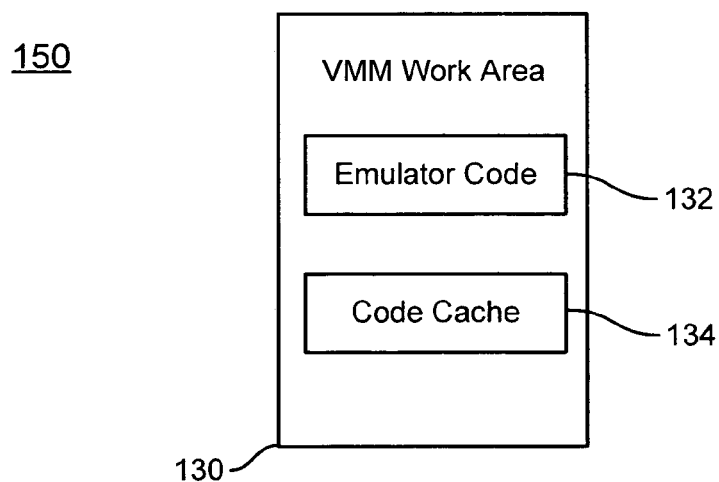
FIG. 1B illustrates a block diagram of an embodiment of a virtual machine monitor.

FIG. 1B illustrates more detail of an embodiment of VMM work area 130. VMM work area 130 of FIG. 1B is the same as that of FIG. 1A. VMM work area 130 includes emulator code 132 and code cache 134. VMM work area 130 handles the context switching between the host environment and the guest environment. The VMM work area may exist within the host operating system or be installed with the host emulator application and assists in emulating the guest environment. As code for a guest environment compatible application is accessed, corresponding code for the host machine is compiled and placed in code cache 134. In one embodiment, code cache 134 may be implemented with between three megabytes and twenty-four megabytes of memory. Code cache 134 may also be associated with a hash table. This is discussed in more detail below.

Figure 2:
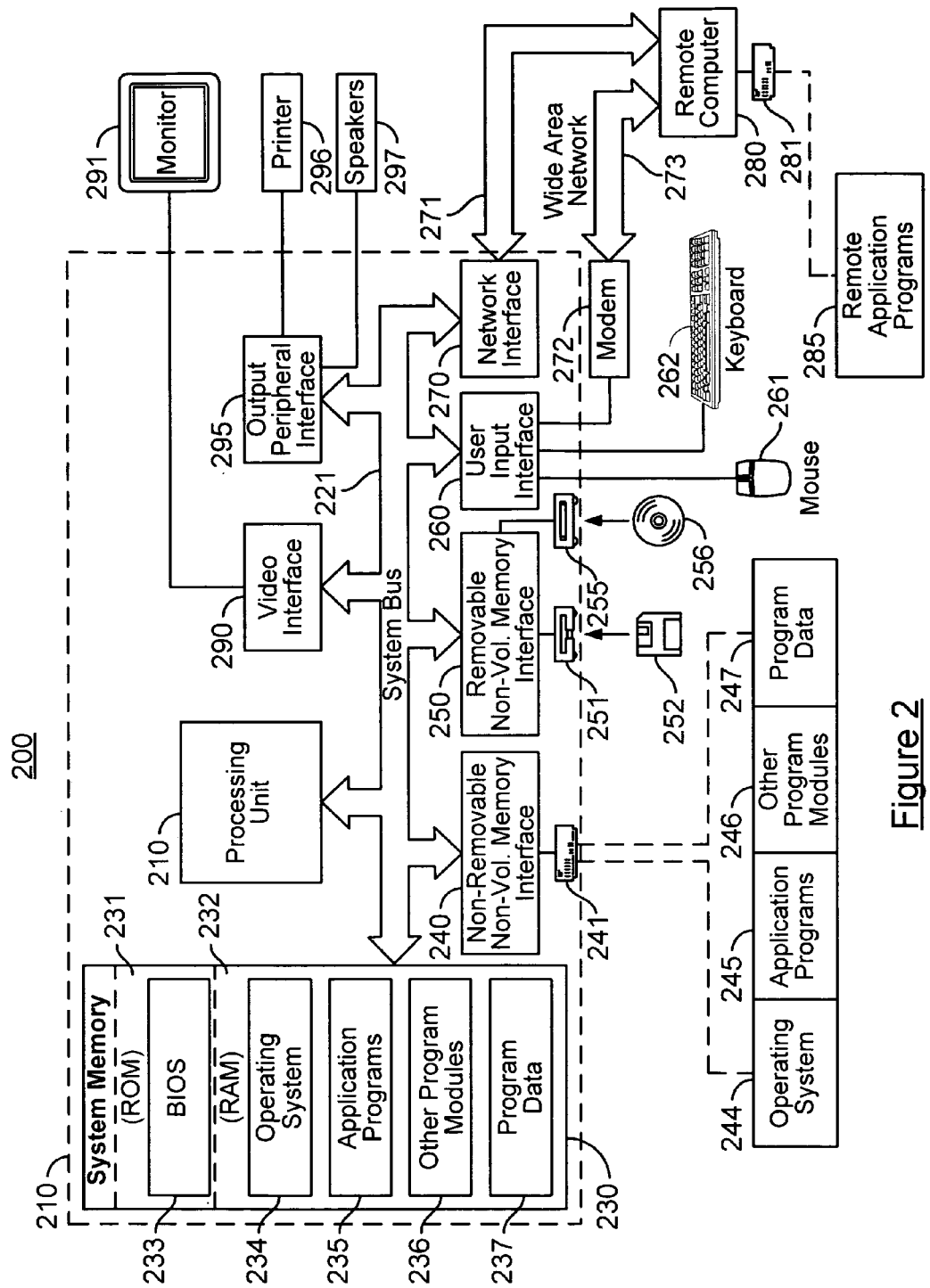
FIG. 2 illustrates an embodiment of a computing environment for use with the present technology.

FIG. 2 illustrates an embodiment of a computing environment 200 for implementing the present technology. In one embodiment, computing environment 200 provides more detail for host machine 110 of FIG. 1A.

FIG. 2 is an illustration of one embodiment of a computing environment for use with the present invention. The computing system of FIG. 2 can be used to implement the servers and storage devices illustrated in system 100 of FIG. 1. In one embodiment, the computing environment can be used to implement the servers and computing devices illustrated in FIGS. 1A-1C.

FIG. 2 illustrates an example of a suitable computing system environment 200 on which the invention may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 240 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through an non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 20 through input devices such as a keyboard 262 and pointing device 261, commonly referred to as a mouse, trackball or touch pad.

Other input devices (not shown) may include a microphone, joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through a output peripheral interface 290.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

As discussed above, system memory 230 includes RAM memory. In one embodiment, compiled code stored in code cache 134 may be stored to a memory location within system memory 230 of computing environment 200. In particular, compiled code may be stored to RAM 232. Additionally, compiled code may be stored and accessed remotely using network interface 270, modem 272, and memory interfaces 240 and 250. In one embodiment, emulator application 115 may be stored in system memory 230 of FIG. 2

Figure 3:
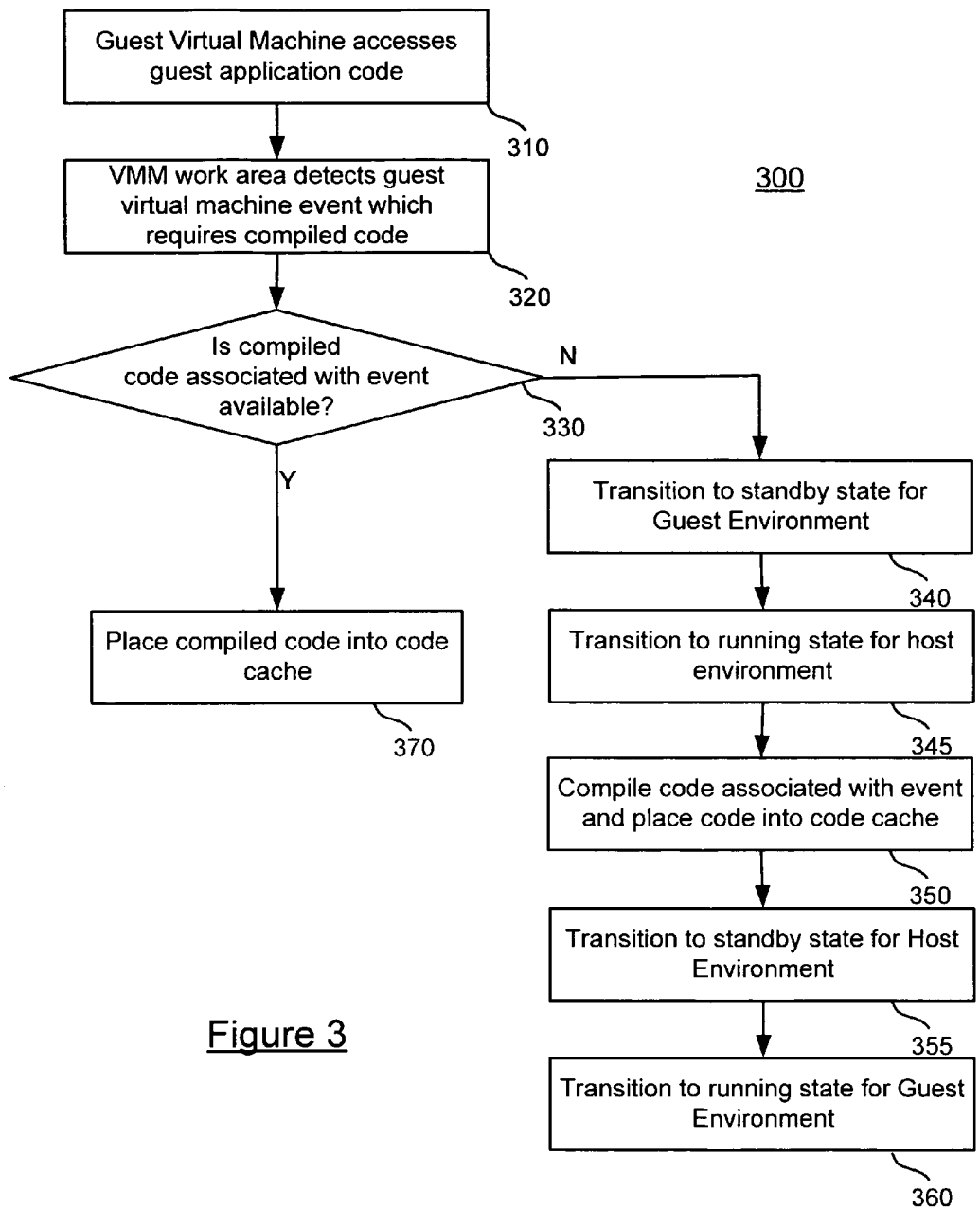
FIG. 3 is a flow chart illustrating an embodiment of a method for emulating a platform.

Emulator application 115 emulates a guest environment by implementing guest virtual machine 120. Guest virtual machine 120 may run applications compatible with the guest environment. FIG. 3 illustrates an embodiment of a method 300 for emulating a guest platform. First, the guest virtual machine accesses guest application code at step 310. The guest application code is associated with a guest application configured to run in the guest environment.

Next, VMM work area 130 detects a guest virtual machine event. The VMM determines that the event requires guest code to be compiled for the host processor 320. One example of detecting an event at step 320 may include determining that compiled code to execute is not found at an expected memory location. For example, a guest application may attempt to retrieve code from a guest memory location associated with the guest virtual machine. In another embodiment, the event may be associated with some task which only the host machine may handle. Such tasks may include page faults, interrupts, and other tasks. For each task, compiled code compatible with the host machine must be executed. In some embodiments, the event may include any task associated with a processor within the x86 family of microprocessors, or similar processors.

Next, a determination is made as to whether any compiled code associated with the detected event is available at step 330. In one embodiment, when the event is detected at step 320, the event is associated with code block identification information. In this case, a query is performed for stored code blocks having matching identification information.

As discussed above, the VMM system handling the event may configure identification information for the event as well. The identification information may include JIT data and other data from either the host or guest environments. Step 330 is discussed in more detail below with respect to method 400 of FIG. 4. If compiled code is available at step 330, operation continues to step 370. If compiled code is not available at step 330, operation continues to step 340.

If compiled code is not available at step 330, the appropriate code must be compiled in the host environment. To achieve this, a switch between environments is required. The guest environment state is transitioned to a standby state at step 340. In one embodiment, the guest environment is paused or otherwise put on hold temporarily. Placing the guest environment in a standby state may include saving guest environment settings and storing the code cache data and other guest environment memory. Next, the host environment state is transitioned to a running state at step 345. This includes loading previous host environment settings associated with the previous running state into memory. The host environment then becomes the active running state for the computing system.

Next, host executable code is compiled for the detected event at step 350. In one embodiment, the code is dynamically compiled for one or more instructions associated with the event. After compiling, the compiled code is placed into the code cache. The state of the host environment is then transitioned to a standby state at step 355. When suspending the host environment, host environment settings and other operating data associated with the host environment state are saved to memory. The guest environment state is then transitioned to a running state at step 360. Transitioning the guest environment to a running state includes reloading any saved settings that were stored when the guest environment state was set to a standby state at step 340.

If compiled code associated with the detected event is available at step 330, the compiled code is placed into code cache 134 at step 370. In some instances, the compiled code may already be in code cache 134. In some situations, the code is retrieved from secondary memory 140 and placed in code cache 134. Once retrieved from a secondary memory 140, the code is placed in the code cache. This is discussed in more detail with respect to method 700.

In one embodiment, a hash table associated with the code cache is updated to indicate that the compiled code is residing in code cache 134. For example, compiled code identification information and the corresponding memory location of the compiled code in the code cache may be added to the hash table. The hash table could then be queried in the future for the identification information, and provide the code cache memory address in response to a match. In some embodiments, an indexing method other than a hash table may be used to track compiled code which is placed into the code cache.

Figure 4:
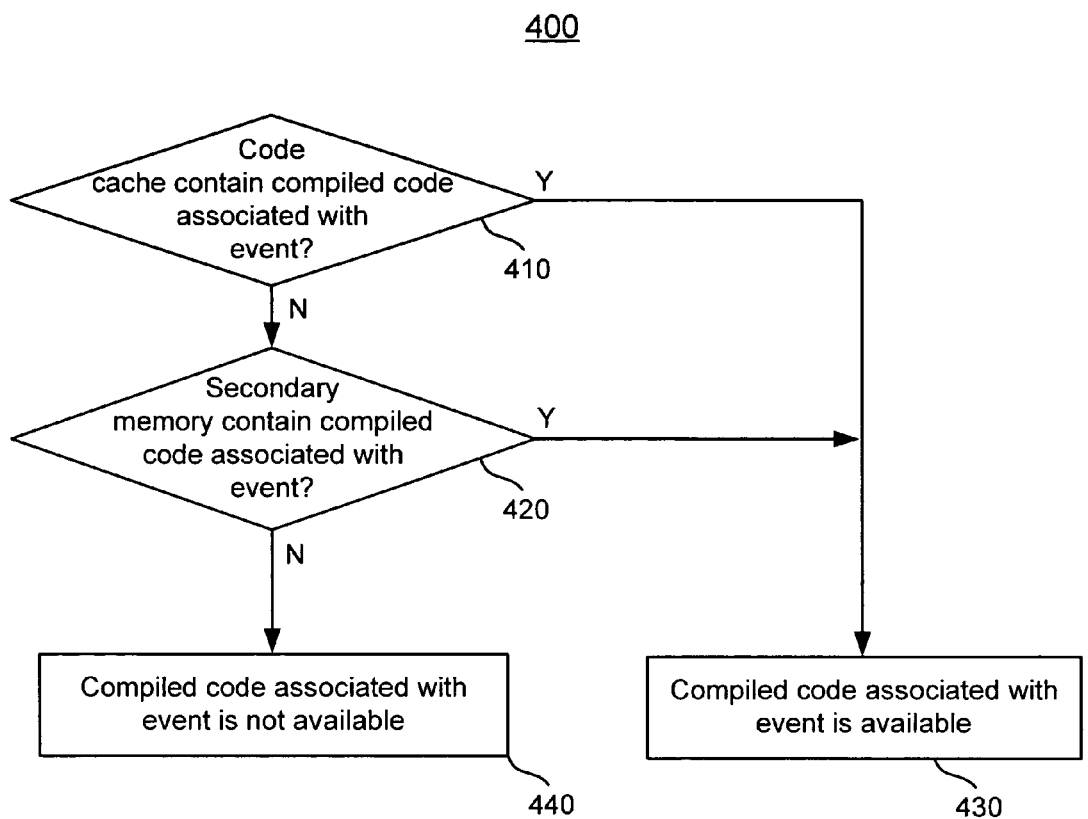
FIG. 4 is a flow chart illustrating an embodiment of a method for determining whether compiled code is available.

As discussed above, compiled code may be located within code cache 134 or secondary memory 140. When compiled code is located in cache or other memory, no transition to the host environment is needed to compile the code. Each memory location may be searched for available compiled code. FIG. 4 illustrates an embodiment of a method 400 for determining whether compiled code associated with an event is available. In one embodiment, method 400 provides more detail for step 330 of method 300 discussed above. A determination is made as to whether code cache 134 contains compiled code associated with the detected event at step 410. Code cache 134 may contain compiled code associated with a previous event if the code has been previously compiled and the contents of code cache 134 have not been flushed or overwritten since the compiled code was generated. To determine whether code cache 134 contains the correct code, code block identification information for the cached code is processed. This is discussed in more detail below with respect to method 500 of FIG. 5. If code cache 134 does not contain compiled code associated with the event, operation continues to step 420. If the code cache does contain compiled code associated with the event, then operation continues to step 430.

A determination is made as to whether secondary memory 140 contains compiled code associated with the detected event at step 420. Secondary memory 140 may contain compiled code if previous code for the detected event has been compiled and the code was saved to secondary memory 140. This is discussed below in more detail with respect to method 500 of FIG. 5. If secondary memory does not contain compiled code associated with the event, operation continues to step 440 and compiled code associated with the event is not available. If secondary memory 140 does contain the compiled code, then a determination is made that the compiled code associated with the event is available at step 430.

Figure 5:
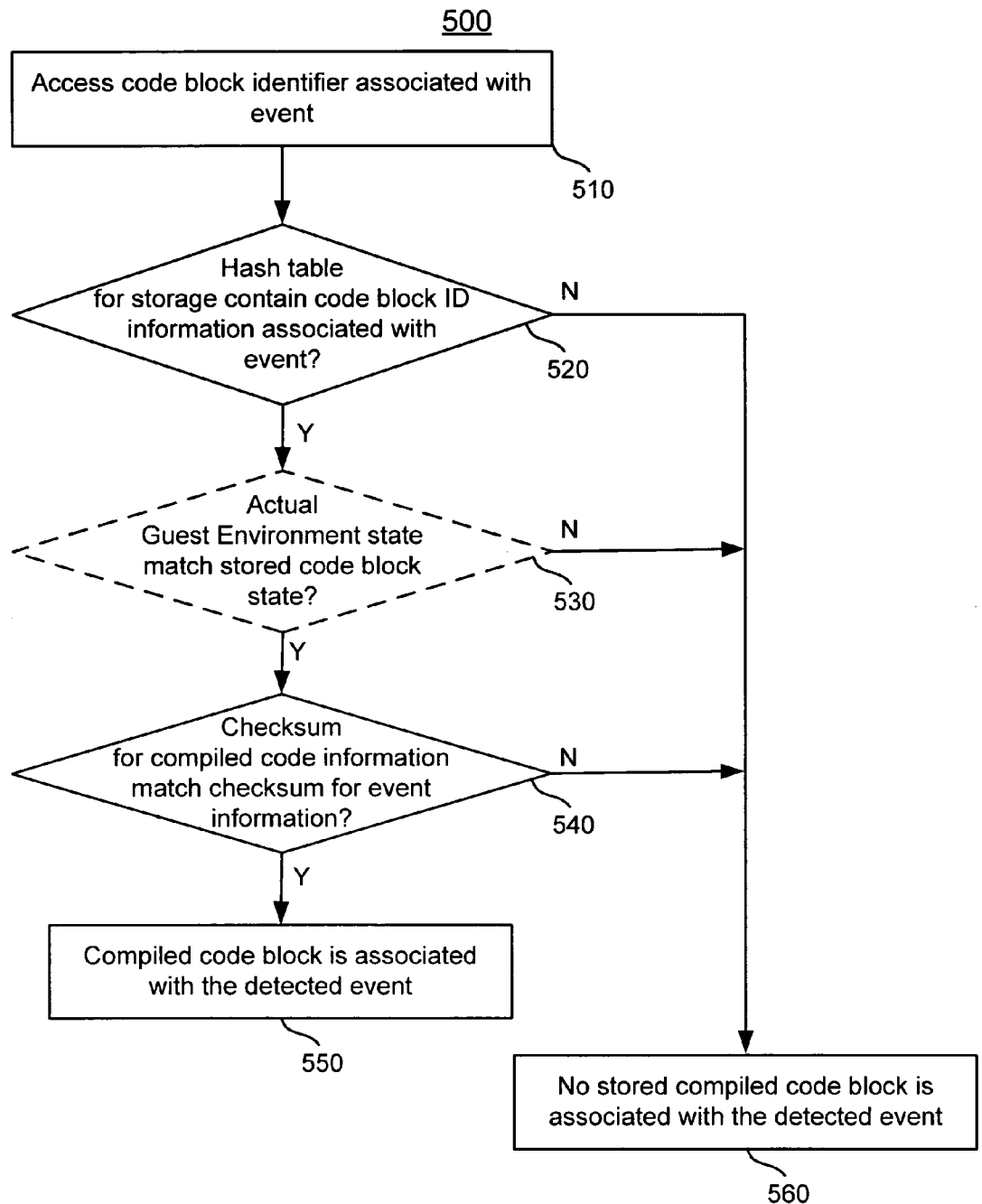
FIG. 5 is a flow chart illustrating an embodiment of a method for determining whether compiled code blocks are associated with a detected event.

In one embodiment, both code cache 134 and secondary memory 140 are associated with a hash table. Each hash table contains code block information for the code blocks stored in its respective memory. FIG. 5 illustrates an embodiment of a method 500 for determining whether a compiled code block is associated with a detected event. In one embodiment, method 500 provides more detail for each of step 410 and 420 of method 400. Thus, method 500 may implement processing of data associated with either code cache 134 or secondary memory 140.

First, code block identification information associated with the detected event at step 320 is accessed at step 510. As discussed above, the code block identification information can be generated by the emulator. Next, a determination is made as to whether a hash table for the particular storage mechanism contains code block identification information that matches identification information for the detected event. The hash table may be associated with cache code 134, secondary memory 140, or both. In one embodiment, when method 500 is performed for code cache 134 (step 410 of method 400), the hash table associated with code cache 134 is searched for the code block identification information. When method 500 is performed for secondary memory 140 (step 420 of method 400), a hash table associated with secondary memory 140 is searched for the code block identification information. In one embodiment, the data structure information associated with a hash table and discussed above can be searched for the appropriate code block information. If the particular hash table does not contain the code block identification information at step 520, operation continues to step 560 where a determination is made that no stored code block is associated with the detected event. If the particular hash table does contain the code block identification information, operation continues to step 530.

In one embodiment, a determination is made as to whether the actual state of the guest virtual machine at the time of the detected event matches a stored state associated with the matching stored code block at step 530. The step of determining whether the guest virtual machine states match is optional. When state matching is employed, a corresponding guest environment state is stored for each code block. The stored guest environment state indicates the state at which the guest virtual machine held at the time the previously compiled code was compiled. In order to use the compiled code for the current event, the actual guest environment state and stored guest environment state should match. Examples of guest environment states include error states, interrupt state, and other states. If the actual guest environment state matches the stored code block state, operation continues to step 540. If the guest environment states do not match, then the operation continues to step 560.

A determination is made as to whether a check sum for compiled code information matches a check sum for the detected event at step 540. In this case, a check sum is generated for the guest instructions being compiled. In some embodiments, a checksum may be generated for other information as well. If these check sums do not match, then operation continues to step 560. If the check sums do match, then the compiled code block is determined to be associated with the detected event at step 550.

As guest virtual machine 120 operates, compiled code accumulates in code cache 134. Over time, code cache 134 fills with code and which is then cleared or overwritten. Before compiled code in code cache 134 is cleared or overwritten, it may be stored to secondary memory 140.

Figure 6:
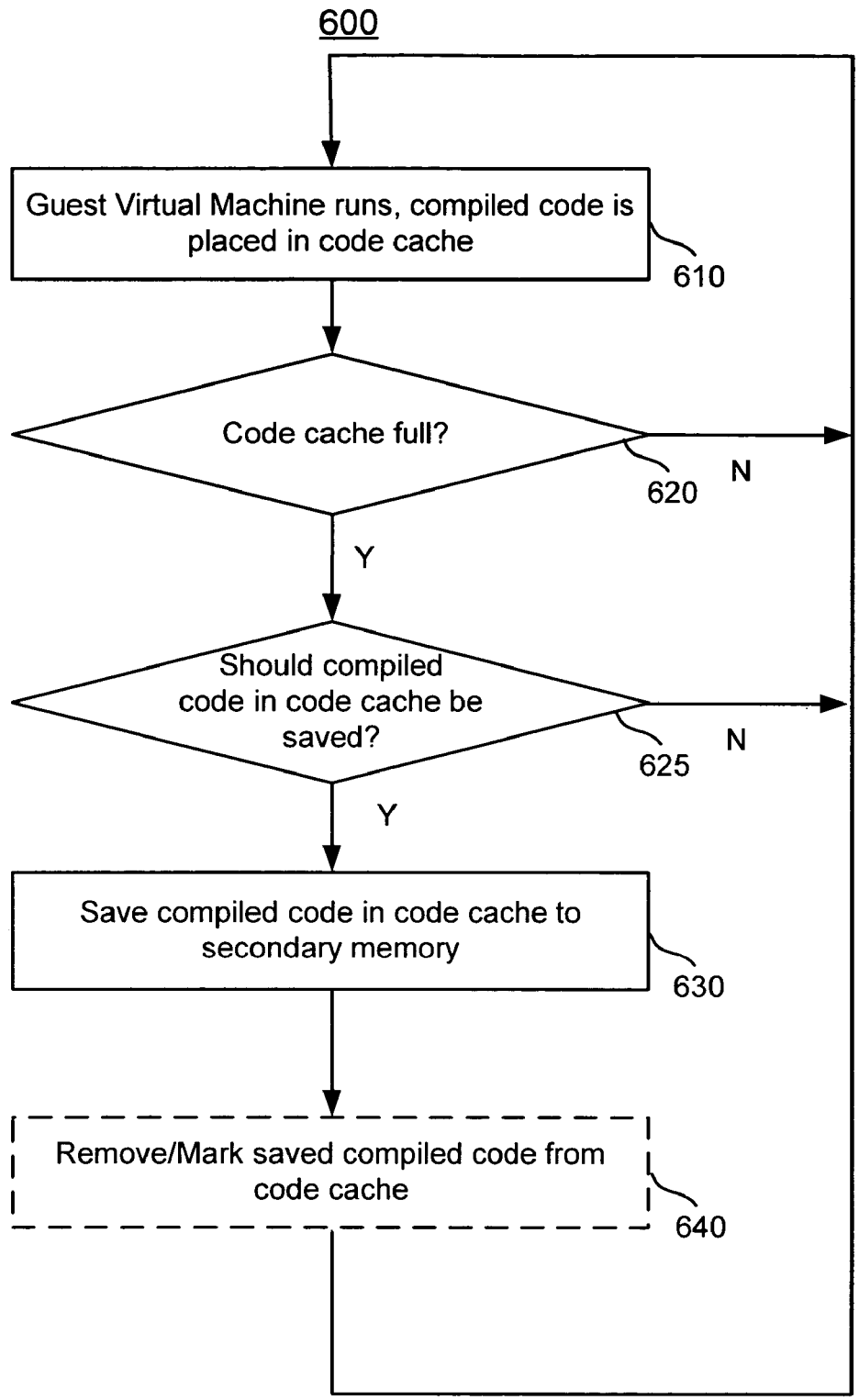
FIG. 6 is a flow chart illustrating an embodiment of a method for storing compiled code.

FIG. 6 illustrates an embodiment of a method 600 for storing compiled code from code cache 134 to secondary memory 140. First, guest virtual machine 120 runs and generates compiled code which is stored code cache 134 at step 610. Next, a determination is made as to whether code cache 134 is full at step 620. In one embodiment, code cache 134 may considered full if no further code can be written to the cache or the space available has fallen below a threshold value. In another embodiment, more space may be needed in code cache 134 if there is not enough room to write compiled code into code cache 134 from secondary memory 140. At step 620, if code cache 134 is not considered full, operation returns to step 610.

If code cache 134 is considered full at step 620, a determination is made at step 625 as to whether the compiled code in code cache 134 should be saved to secondary memory 140 at step 625. In one embodiment, the compiled code should be saved if the code is not already stored in secondary memory 140. In this case, VMM work area 130 may query secondary memory 140 to determine if the code is currently stored in secondary memory 140. In some embodiments, the compiled code may not need to be stored in secondary memory 140 if there is a guest environment condition that justifies clearing the entire code cache. An example of a guest environment condition is a determination that it is more efficient to clear the code cache without storing the compiled code contained in the cache. In some cases, the time saved by not storing the compiled code to be cleared from the code cache outweighs the time required to re-compile the code in case it is used again. If the compiled code in code cache 134 should be stored, operation continues to step 630. If the compiled code in code cache 134 should not be stored, operation continues to step 610.

Compiled code within code cache 134 is saved to secondary memory 140 at step 630. The compiled code saved to secondary memory 140 may include code that was actually executed by host machine 110. In some cases, all the compiled code in code cache 134 is stored to secondary memory 140. In one embodiment, a hash table associated with secondary memory 140 is updated to indicate that the compiled code is residing in secondary memory 140. For example, compiled code identification information and the corresponding memory location of the compiled code in secondary memory 140 may be added to the hash table. The hash table could then be queried in the future for the identification information, and provide the secondary memory address in response to a match.

In one embodiment, the code saved to secondary memory 140 is removed or marked as being removed from code cache 134 at step 640. The dashed line comprising the box of step 640 indicates this step is optional. In one embodiment, code cache 134 is not actually removed, but a hash table or other code cache map associated with code cache 134 is marked to indicate that the compiled code in code cache 134 may be overwritten. In some embodiments, the marking may be performed as part of step 630, wherein a separate step is not required. In this case, rather than indicate in a hash table that the code is saved to a secondary memory, block identification information associated with the code is updated to indicate that the code is saved to a secondary memory location. Operation then returns to step 610.

Figure 7:
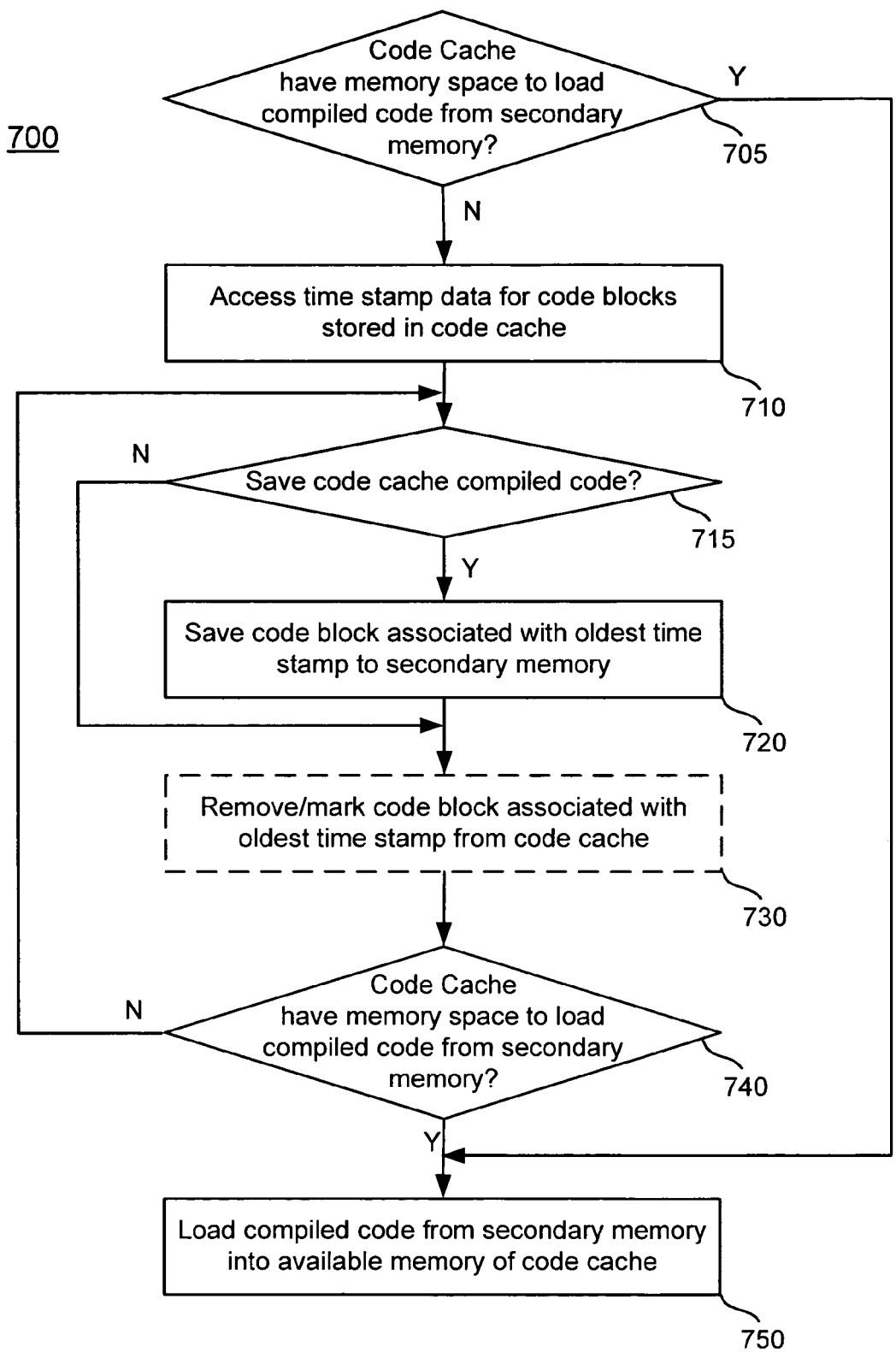
FIG. 7 is a flow chart illustrating an embodiment of a method for loading compiled code into code cache.

As discussed above with respect to step 370 of method 300, compiled code stored in second memory location 140 may be loaded into code cache 134. However, code cache 134 may not have enough space for the compiled code. In this case, space must be generated in code cache 134 in order to load the compiled code into the cache. FIG. 7 illustrates an embodiment of a method 700 for loading compiled code into a code cache. In one embodiment, method 700 provides more detail for step 370 discussed above with respect to method 300.

First, a determination is made as to whether code cache 134 has memory space to load compiled code from secondary memory 140 at step 705. If cache code 134 has enough available space, operation of method 700 continues to step 750. If code cache 134 does not have enough available space at step 705, method 700 continues to step 710.

After a determination that code cache 134 does not have enough available memory space to load the compiled code, the code currently contained in the cache is analyzed to determine the oldest code. The compiled code to be loaded in the cache is eventually written over the oldest code currently in the cache. Several methods may be used to determine the period of time that code has been residing in the code cache, including comparison of code time stamp data. Time stamp data for the code blocks stored in code cache 134 are accessed at step 710. In one embodiment, a time stamp is associated with each block. The time stamp is typically associated with the time each code block was last accessed or when the code was written to the code cache.

Next, a determination is made at step 625 as to whether the compiled code in code cache 134 should be saved at step 715. In one embodiment, the compiled code should be saved if the code is not already stored in secondary memory 140. Similar to step 625 discussed above, VMM work area 130 may query secondary memory 140 to determine if the code is currently stored in secondary memory 140. In some embodiments, the compiled code may not need to be stored in secondary memory 140 if there is a guest environment change that justifies clearing the entire code cache. If the compiled code in code cache 134 should be stored, operation continues to step 720. If the compiled code in code cache 134 should not be stored, operation continues to step 730.

Next, the code block associated with the oldest time stamp is saved to secondary memory 140 at step 720. In one embodiment, the code block (the compiled code) associated with the oldest time stamp is then removed or marked as being removed from code cache 134 at step 730. The dashed line comprising step 730 indicates that this step is optional. In this case, indicating that the code is removed or that the memory space in the cache may be written to may be performed as part of step 730 when the code is saved to secondary memory at step 720. In any case, the oldest code blocks (compiled code) in the code cache are not kept in the code cache. This allows the most recently used code blocks to remain in the code cache. In some embodiments, the most recently used or accessed code blocks may be more likely to be used again.

A determination is made as to whether code cache 134 has enough memory space to load the compiled code from secondary memory 140 at step 740. If after deleting the oldest code block there is enough space to load the compiled code from secondary memory 140, the compiled code is loaded from secondary storage location 140 into available memory in code cache 134 at step 750. In one embodiment, code blocks may be manipulated to align available space in consecutive memory block addresses. If code cache 134 still does not have enough memory space to load the compiled code from secondary memory 140 at step 740, then method 700 returns to step 720. At step 720, the process repeats wherein the oldest code block is saved and to secondary memory 140 and removed from code cache 134 in order to make room for the compiled code.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

I claim:

1. A method for executing code, comprising:
   detecting an event in an emulated environment having a current state;
   generating first code block identification information for code associated with the event, the first code block identification information is based on one or more guest virtual memory addresses;
   determining that compiled code associated with the event is not stored in a code cache;
   determining that compiled code that is associated with the event and that corresponds to a previous state of the emulated environment that matches the current state is stored in a secondary storage, wherein said step of determining includes matching the first code block identification information with an entry in table that stores code block identification information associated with previously compiled code that is stored on the secondary storage;
   accessing said compiled code from said secondary storage based on said entry; and
   executing the accessed compiled code.

2. The method of claim 1, wherein said step of accessing compiled code includes:

matching identification information associated with the detected event to identification information associated with the compiled code.

3. The method of claim 2, wherein said step of accessing compiled code includes:
retrieving a memory location associated with the identification information.

4. The method of claim 1, wherein the event is associated with a page fault.

5. The method of claim 1, wherein the event is associated with an interrupt event.

6. The method of claim 1, wherein the event is a determination that code configured for the host environment can not be found.

7. The method of claim 1, wherein the secondary storage is a hard disk.

8. The method of claim 1, wherein the determining that compiled code associated with the event is not stored in a code cache includes accessing a first table that tracks compiled code in the code cache; wherein the determining that compiled code is stored in a secondary storage includes accessing a second table that tracks compiled code in the secondary storage.

9. The method of claim 1, wherein the first code block identification information includes a guest page logical address.

10. The method of claim 1, wherein the first code block identification information includes a virtual page address associated with a bus page.

11. The method of claim 1, wherein the determining that compiled code associated with the event is not stored in a code cache includes searching a first hash table to determine whether the compiled code resides in a code cache in primary storage; and the determining that compiled code that is associated with the event and that corresponds to a previous state of the emulated environment that matches the current state is stored in a secondary storage includes searching a second hash table to determine whether the compiled code resides in said secondary storage.

12. One or more processor readable storage devices having processor readable code embodied on said processor readable storage devices, said processor readable code for programming one or more processors to perform a method comprising:
placing compiled code into a code cache, the compiled code is a compiled version of guest application code associated with an emulated environment;
storing first information in a first table that provides a code cache location of the compiled code for the guest application code;
accessing the compiled code stored in the code cache;
storing the compiled code to a secondary storage;
storing second information in a second table that tracks compiled code in the secondary storage, the second table includes code block identification information associated with the guest application code that was compiled and includes information that describes a first state the emulated environment had at the time the code was compiled;
loading the compiled code from the secondary storage into the code cache;
determining a second state of the emulated environment at the time of an event associated with the emulated environment;
determining that the first state matches the second state based on the second information;
identifying the compiled code based on the second information; and
executing the compiled code.

13. The one or more processor readable storage devices of claim 12, wherein said loading the compiled code includes:
confirming the compiled code is associated with the event.

14. The one or more processor readable storage devices of claim 12, wherein said confirming includes:
determining the code cache does not have enough available memory space to load the compiled code; and
generating available memory space in the code cache to load the compiled code.

15. The one or more processor readable storage devices of claim 14, wherein said generating available memory space includes:
selecting existing compiled code in the code cache to store;
storing the existing compiled code to the secondary storage.

16. A method for processing compiled code, comprising:
storing compiled code to secondary storage, the compiled code associated with a first state of a guest environment;
storing first identification information in a first table, the first identification information identifies the first state of the guest environment;
loading the compiled code from said secondary storage into a code cache;
determining second identification information associated with a current state of the guest environment at the time of an event associated with the guest environment, the event occurs after the compiled code was stored to the secondary storage;
identifying compiled code associated with the event said identifying includes searching for the compiled code in the code cache and in the secondary storage if the compiled code is not found in the code cache, the identifying includes determining the first state matches the current state of the guest environment based on the first identification information matching the second identification information; and
executing the identified compiled code.

17. The method of claim 16, wherein the first identification information and second identification include checksum information, the checksum is based on the code that was compiled.

18. The method of claim 16, wherein said loading the compiled code into a code cache includes:
loading the compiled code into the code cache; and
configuring an indexing mechanism associated with the code cache to include identification information associated with the loaded compiled code.

19. The method of claim 16, wherein said loading the compiled code includes:
storing existing code in the code cache to the secondary storage; and
writing the compiled code to the code cache.

20. The method of claim 16, wherein the first table tracks the compiled code in the secondary storage.

* * * * *